US007991759B2

(12) United States Patent
Kikkoji et al.

(10) Patent No.: US 7,991,759 B2
(45) Date of Patent: Aug. 2, 2011

(54) COMMUNICATION APPARATUS, COMMUNICATION METHOD AND COMMUNICATION PROGRAM

(75) Inventors: Hiroyuki Kikkoji, Tokyo (JP); Nozomu Okuzawa, Tokyo (JP); Tsuguyo Goto, Kanagawa (JP); Yuko Suzuki, Tokyo (JP); Takashi Sakurazawa, Tokyo (JP)

(73) Assignee: Sony Corporation, Tokyo (JP)

( * ) Notice: Subject to any disclaimer, the term of this patent is extended or adjusted under 35 U.S.C. 154(b) by 74 days.

(21) Appl. No.: 10/572,743

(22) PCT Filed: Jun. 7, 2004

(86) PCT No.: PCT/JP2004/009889
§ 371 (c)(1),
(2), (4) Date: Mar. 21, 2006

(87) PCT Pub. No.: WO2005/031700
PCT Pub. Date: Apr. 7, 2005

(65) Prior Publication Data
US 2007/0088778 A1    Apr. 19, 2007

(30) Foreign Application Priority Data
Sep. 29, 2003 (JP) ................................. 2003-337219

(51) Int. Cl.
*G06F 7/00* (2006.01)
(52) U.S. Cl. ........................................ 707/708; 709/217
(58) Field of Classification Search ............... 707/2, 708
See application file for complete search history.

(56) References Cited

U.S. PATENT DOCUMENTS

| 6,560,404 | B1* | 5/2003 | Okada et al. ..................... 386/95 |
| 2001/0044838 | A1* | 11/2001 | Iida ................ 709/219 |
| 2002/0010740 | A1* | 1/2002 | Kikuchi et al. ............... 709/203 |
| 2002/0064096 | A1* | 5/2002 | Ukita et al. .................... 368/66 |
| 2002/0114455 | A1* | 8/2002 | Asahi et al. ................... 380/201 |
| 2002/0123990 | A1* | 9/2002 | Abe et al. .......................... 707/3 |
| 2004/0044473 | A1* | 3/2004 | Leem ........................... 701/211 |
| 2005/0060701 | A1 | 3/2005 | Murase |
| 2005/0091679 | A1 | 4/2005 | Tanaka et al. |

FOREIGN PATENT DOCUMENTS

| JP | 10-302150 | 11/1998 |
| JP | 2000-332822 | 11/2000 |

(Continued)

OTHER PUBLICATIONS

U.S. Appl. No. 10/526,902, filed Aug. 16, 2005, Yamashita et al.

(Continued)

*Primary Examiner* — Charles Rones
*Assistant Examiner* — Fazlul Quader
(74) *Attorney, Agent, or Firm* — Oblon, Spivak, McClelland, Maier & Neustadt, L.L.P.

(57) ABSTRACT

When a retrieval keyword that requires contents is transmitted to a server, the server retrieves contents from a database based on the retrieval keyword, and generates page information including retrieved list information of contents, and appending information that displays whether or not the page information is provided with a consecutive reproduction function of making a terminal device consecutively reproduce part of contents included in the list information respectively to the page information, and transmits the page information. The terminal device displays a list of contents on a display unit based on the page information, and displays an icon in case the list is provided with the consecutive reproduction function to demonstrate that the consecutive reproduction is possible.

21 Claims, 10 Drawing Sheets

FOREIGN PATENT DOCUMENTS

| | | |
|---|---|---|
| JP | 2002-055994 | 2/2002 |
| JP | 2002-99283 | 4/2002 |
| JP | 2002-099287 | 4/2002 |
| JP | 2002-163560 | 6/2002 |
| JP | 2002-182661 | 6/2002 |
| JP | 2002-341876 | 11/2002 |
| JP | 2003-50816 | 2/2003 |
| JP | 2003-091476 | 3/2003 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner (A) SCREEN DISPLAYING TUNE LIST (B) TRANSITION OF ICON

COMMUNICATION APPARATUS, COMMUNICATION METHOD AND COMMUNICATION PROGRAM

TECHNICAL FIELD

The present invention relates to a communication apparatus, a communication method, and a communication program which retrieve contents and provide thus retrieved contents, and more particularly, to a communication apparatus, a communication method, and a communication program which are provided with a function of making an external device consecutively reproduce retrieved contents.

BACKGROUND ART

In recent years, as recording media such as CDs (Compact Discs) are coming into wide use and various audio compression techniques are making advance, music data is digitalized to be processed in general. Furthermore, as selling commercial products using the Internet is becoming widespread, there is employed a method of selling music CDs and their audio data through the Internet. For example, there are provided a service of delivering a package of music CDs to an applicant's home when making an application of purchasing the package through a Web site of a CD shop, and a service of providing downloadable audio data of tunes by an album unit or by a tune unit from a fee-based music delivery site.

In case of purchasing music data through the Internet, application for purchase is possible after having an access to a CD shop site or a music delivery site, and carrying out retrieval using a desired tune name or artist name, and displaying a list of music CDs or a list of tunes on a display and confirming the contents thereof. There are many services which allow experimentally listening to tunes displayed in a list before purchasing the tunes. In this case, a selling site prepares compressed data for part of tunes respectively in advance, and delivering the compressed data of the tunes in the streaming manner in answer to a request from the user. The user can reproduce and output thus delivered compressed data only once.

Furthermore, there is employed a method of displaying a list of tunes on a display of the user, and consecutively reproducing thus displayed respective tunes automatically. This function, which not only makes the user confirm the contents of the tunes before purchase but also brings about an effect of introducing the tunes to the user, is very important for promoting the selling.

As a conventional related art, there is employed a tune identification delivery system, to be explained hereinafter, in which a tune is easily specified using part fragment of the tune and the tune can be purchased after experimentally listening to the tune. In the system, firstly, music data is recorded to a cellular phone terminal using a microphone, and thus recorded music data is transmitted to the tune identification delivery system. Then, the tune identification delivery system retrieves data for experimental listening corresponding to the music data by employing matching, and transmits thus retrieved data to the cellular phone terminal. After experimentally listening to the data for experimental listening using the cellular phone terminal, the user can have an access to a music delivery system to purchase the music (for example, refer to Patent Document 1).

Patent Document 1 (Japanese Patent Laid-Open Publication No. 2002-116768, paragraph numbers [0053] to [0072], FIG. 7).

DISCLOSURE OF THE INVENTION

On the other hand, in above-described CD shop site or music delivery site, it is considered that a consecutive reproduction function for a displayed list of tunes is not provided for all albums or all sites. That is, in respective selling sites that can be accessed by the user, there mixedly exist tune lists which are provided with a function of consecutively reproducing tunes in a list, and tune lists which are not provided with such a function or provided with such a function that is not active.

In this case, since it is very difficult for the user to judge whether or not tunes of a displayed tune list of an album can be consecutively reproduced at one view, there may be raised a case in which the user who looked at the display is confused and the operationality is disturbed. The confusion of the user may disturb the selling promotion. Especially, hereinafter, in case it becomes possible to purchase music data by having an access to above-described site from a household audio instrument or a cellular phone, since such devices are not provided with a wide display or a keyboard, amount of information which can be displayed is restricted, and simple handling is required, it is necessary to avoid above-described situations which raise the confusion of the user.

DISCLOSURE OF THE INVENTION

It is therefore an object of the present invention to overcome the above-mentioned drawbacks by providing a communication apparatus which can definitely notify the user whether or not retrieved lists of contents are provided with the consecutive reproduction function when the lists are displayed.

It is another object of the present invention to provide a communication method which can definitely notify the user whether or not retrieved lists of contents are provided with the consecutive reproduction function when the lists are displayed.

It is yet another object of the present invention to provide a communication program which can definitely notify the user whether or not retrieved lists of contents are provided with the consecutive reproduction function when the lists are displayed.

Accordingly, the present invention has an object to overcome the above-mentioned drawbacks of the prior art by providing a communication apparatus that retrieves contents and provides thus retrieved contents, including: a reception means for receiving a retrieval keyword that requires contents from an external device; a retrieval means for retrieving contents from a database based on the retrieval keyword received by the reception means; a page information generation means for generating page information including list information of contents retrieved by the retrieval means, and appending information that displays whether or not the page information is provided with a consecutive reproduction function of making the external device consecutively reproduce part of contents included in the list information respectively to the page information; and a transmission means for transmitting the page information generated by the page information generation means to the external device.

The reception means receives a retrieval keyword that requests contents from an external device. The retrieval means retrieves contents from a database based on the received retrieval keyword. The page information generation means generates page information including retrieved list information of contents. At this time, the page information generation means appends information that displays whether or not the page information is provided with a consecutive reproduction function of making the external device consecutively reproduce part of contents included in the list information respectively to the page information. The transmission means transmits the generated page information to the external device. Accordingly, the external device that transmits the retrieval keyword displays the retrieved list information of contents, and can display a notification indication that indicates whether or not the consecutive reproduction function is provided on the display screen thereof.

According to the communication apparatus of the present invention, the external device that receives the page information generated by the page information generation means displays the retrieved list information of contents, and can display a notification indication that indicates whether or not the consecutive reproduction function is provided on the display screen thereof. Accordingly, the user can definitely and instantly judge whether or not lists of contents displayed as a result of the retrieval are provided with the consecutive reproduction function, which can make the user carry out the following operations without raising the confusion.

BEST MODE FOR CARRYING OUT THE INVENTION

The present invention will further be described below concerning the best modes for carrying out the present invention with reference to the accompanying drawings. In the following explanation, the processing of storing (saving) relevant information related to a tune or a group of tunes in a secondary storage device is referred to as clipping. Information that is stored by clipping is referred to as clipped information.

Figure 1:
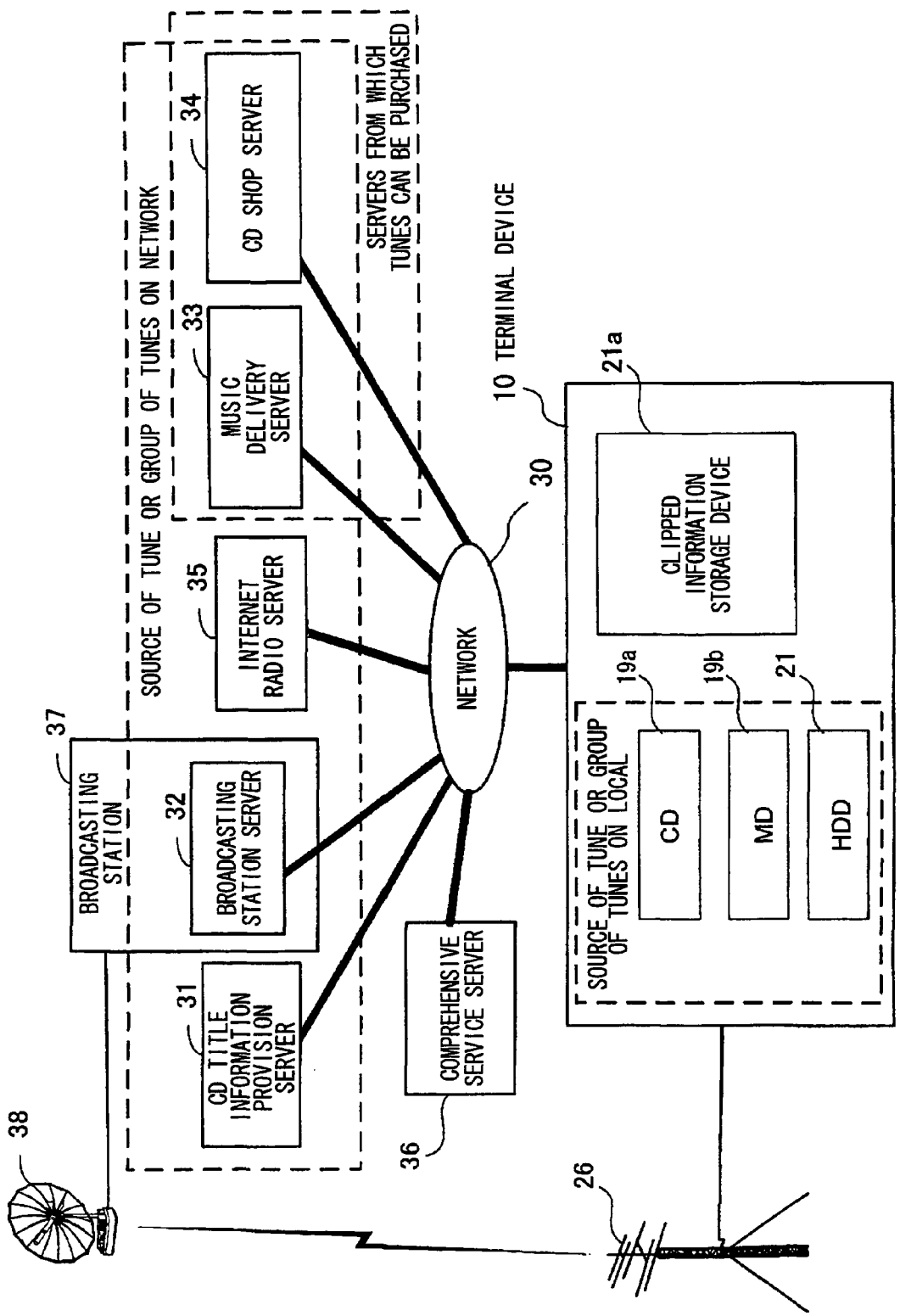
FIG. 1 shows a block diagram of a network system according to an embodiment of the present invention.

FIG. 1 shows a block diagram of a network system according to an embodiment of the present invention. In FIG. 1, a terminal device 10 is connected to respective servers through a network 30. The network 30 is, for example, the Internet. As servers, there may be a CD title information provision server 31, a broadcasting station server 32, a music delivery server 33, a CD shop server 34, an Internet radio server 35, a comprehensive service server 36, etc.

The CD title information provision server 31 performs a service of delivering titles of tunes recorded in commercially available music CDs, album titles, etc. The broadcasting station server 32 is a server that a broadcasting station 37 for the FM broadcasting or television (TV) broadcasting manages. The broadcasting station 37 carries out broadcasting by radio through an antenna 38, and the broadcasting station server 32 performs a service of providing relevant information or a tune list of tunes to be broadcasted (now on air).

Information that will be provided by the broadcasting station server 32 includes information concerning tunes which are broadcasted or to be broadcasted in respective programs. Specifically, for example, relevant information such as a list of tunes (on air list) which are broadcasted or to be broadcasted in a desired program, tune names or artist names of respective tunes, a title of a music CD having recorded therein those tunes and identification ID can be retrieved to be provided.

The music delivery server 33 is a server that performs a service of delivering digital audio data (tune data) of tunes. For example, the music delivery server 33 provides tune data to the terminal device 10 of a user who carried out the procedure of purchasing tunes. Furthermore, the music delivery server 33 can provide relevant information of tunes to be delivered and audio data for experimental listening.

The CD shop server 34 is a server that accepts orders for correspondence sales of music CDs, etc. The CD shop server 34 also performs a service of delivering audio data for experimental listening. The Internet radio server 35 is a server that provides audio programs through a wide-area network such as the Internet.

The comprehensive service server 36 functions as a window (portal site) for providing service through the network 30, and mediates the provision of various comprehensive services using above-described respective servers. For example, the comprehensive service server 36 delivers information indicative of the source that delivers relevant information of tunes being broadcasted (for example, URL: Uniform Resource Locator) to the terminal device 10. Furthermore, the comprehensive service server 36 delivers a call sign of a broadcasting station corresponding to a frequency of reception area to the terminal device 10. Moreover, the comprehensive service server 36 performs the procedure of registering users who utilize above-described various comprehensive services and the procedure of authentication at the time of utilization.

In this way, the plural servers perform a service of providing information related to a tune or a group of tunes on the network 30. That is, each server functions as the source of a tune or a group of tunes on the network 30.

The music delivery server 33 and the CD shop server 34 are servers from which tunes can be purchased. Accordingly, operating the terminal device 10 to have an access to the servers from which tunes can be purchased, the user can actually purchase a tune or a group of tunes through the network 30. Carrying out the procedure of purchase with the music delivery server 33, the user of the terminal device 10 can download tune data from the music delivery server 33. Furthermore, carrying out the procedure of purchase with the CD shop server 34, the user of the terminal device 10 can have music CD's delivered to the user's home.

The terminal device 10 retains the sources of a tune or a group of tunes on the local in recording media or a CD 19a, an MD (Mini Disc) 19b, an HDD (Hard Disc Drive) 21, etc. The CD 29a and MD 29b are portable recording media, and can be easily attached to and detached from the terminal device 10. Which local source is prepared for the terminal device 10 varies depending on the kind of the terminal device 10 and the purpose. Moreover, the terminal device 10 can receive broadcasted contents through an antenna 26.

The sources of a tune or a group of tunes on the local shown in FIG. 1 are examples. That is, having recorded therein a tune or a group of tunes, a recording medium located on the local of the terminal device 10 functions as the source of a tune or a group of tunes on the local.

The terminal device 10 has a clipped information storage device 21a that stores relevant information that is clipped (clipped information). The clipped information storage device 21a is a secondary storage device of the terminal device 10. For example, part of the storage area of the HDD 21, etc. can be made to function as the clipped information storage device 21a. The terminal device 10 can perform the clipping for a tune or a group of tunes. Accordingly, as for an FM program or a CD album containing many tunes of interest, relevant information of a group of tunes of interest can be entirely clipped to be recorded by performing the clipping once.

Figure 2:
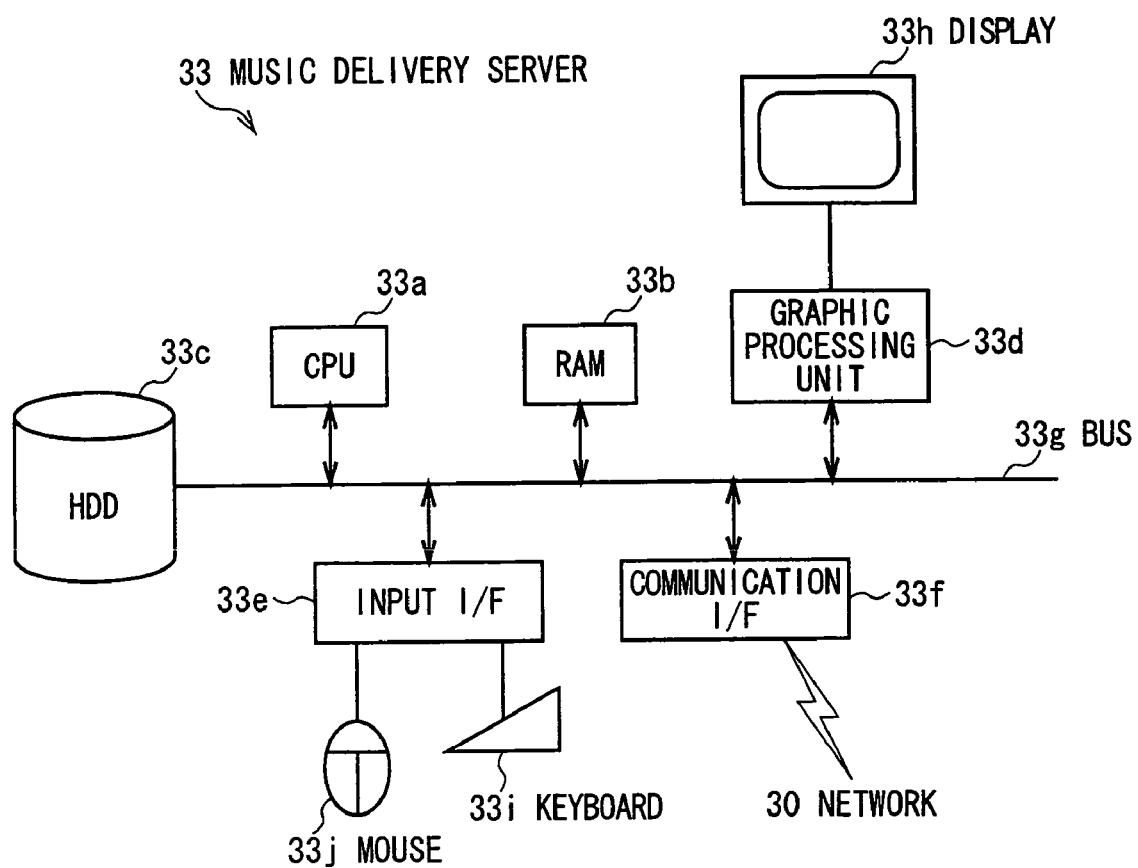
FIG. 2 shows a block diagram of the hardware configuration of a music delivery server according to an embodiment of the present invention.

FIG. 2 shows a block diagram of the hardware configuration of the music delivery server 33 (communication apparatus). The music delivery server 33 has its entire apparatus controlled by a CPU (Central Processing Unit) 33a (retrieval means and page information generation means). To the CPU 33a, a RAM (Random Access Memory) 33b, an HDD (Hard Disc Drive) 33c, a graphic processing unit 33d, an input interface (I/F) 33e, and a communication interface (I/F) 33f (reception means and transmission means) are connected through a bus 33g.

In the RAM 33b, at least a part of programs or application programs of the OS (Operating System) to be executed by the CPU 33a are temporarily stored. Furthermore, in the RAM 33b, various data necessary for the processing in the CPU 33a is stored. In the HDD 33c, the OS or application programs are stored. Moreover, in the HDD 33c, audio data to be provided to the terminal device 10 is stored.

To the graphic processing unit 33d, a display 33h is connected. The graphic processing unit 33d displays images on a screen of the display 33h in accordance with commands from the CPU 33a. To the input interface 33e, a keyboard 33i and a mouse 33j are connected. The input interface 33e sends signals sent from the keyboard 33i and mouse 33j to the CPU 33a through the bus 33g.

The communication interface 33f is connected to the network 30. The communication interface 33f transmits/receives data to/from other computers through the network 30.

With above-described hardware configuration, the processing function in the embodiment can be realized. In FIG. 2, the hardware configuration of the music delivery server 33 is explained representatively. On the other hand, other servers can be realized by similar hardware configuration.

The terminal device 10 in the embodiment is also provided with a function of an audio device that is provided with a function of reproducing tunes.

Figure 3:
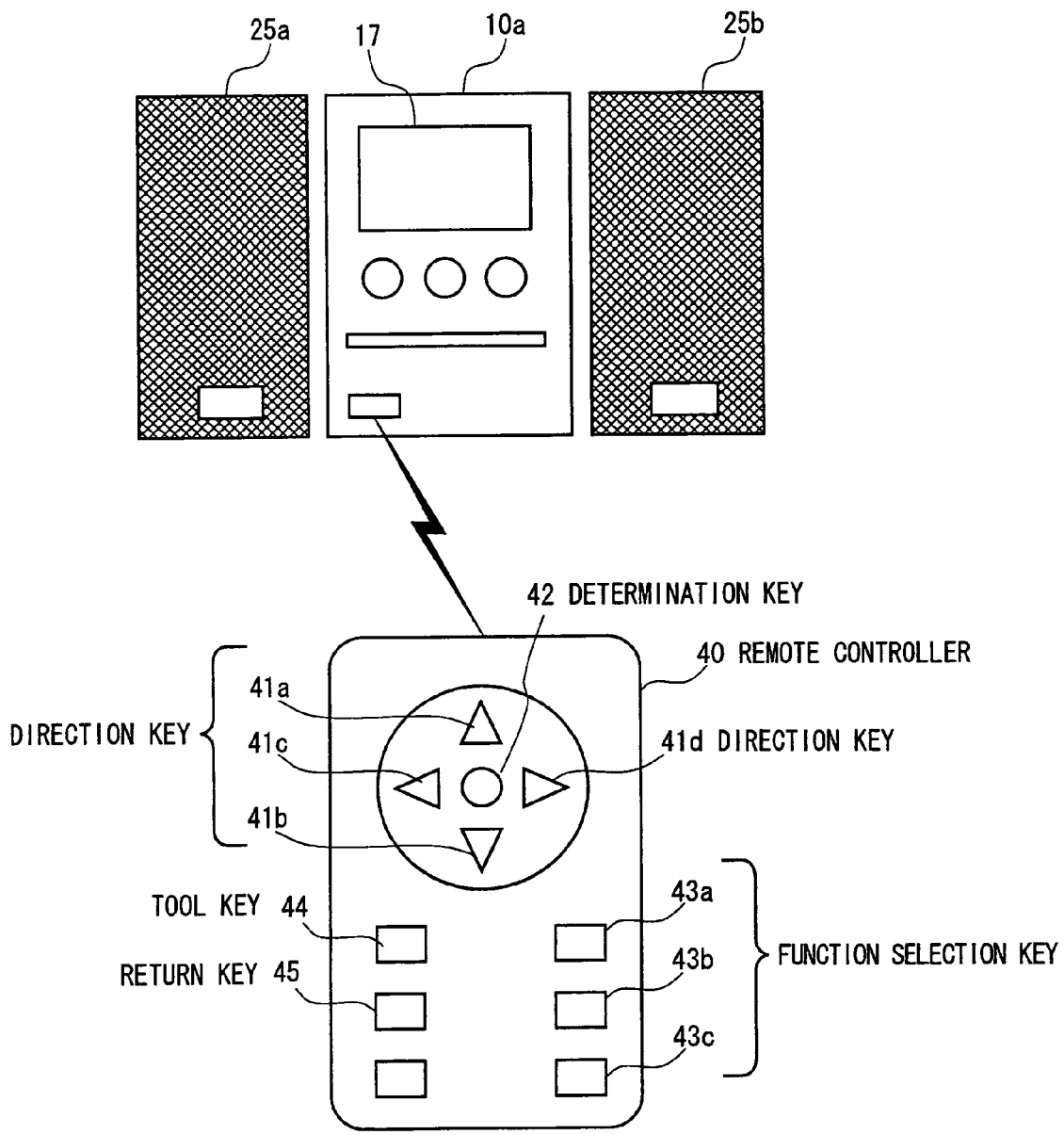
FIG. 3 shows a schematic view of a terminal device according to an embodiment of the present invention.

FIG. 3 shows a schematic view of the terminal device 10. As shown in FIG. 3, the exterior appearance of the terminal device 10 is similar to that of a general system component. The terminal device 10 is composed of a device main body 10a, loudspeakers 25a, 25b, and a remote controller 40. The device main body 10a is provided with the reproduction function for a CD, record and reproduction function for an MD, reception function for receiving FM broadcasting and TV broadcasting. When audio signals generated by the device main body 10a are sent to the loudspeakers 25a, 25b, sounds are output from the loudspeakers 25a, 25b.

The device main body 10a has a display 17. On the display 17, tune information of a tune being reproduced and clipped information that is stored by clipping are displayed.

The remote controller 40 is an input device for use in remote-controlling the device main body 10a. The remote controller 40 has arranged thereon a plurality of operation keys. When the operation keys are pushed by the user, signals corresponding to thus pushed operation keys are transmitted from the remote controller 40 to the device main body 10a by means of a radio communication means such as an infrared ray.

As the operation keys, there are direction keys 41a to 41d, a determination key 42, function selection keys 43a to 43c, a tool key 44, a return key 45, etc. The direction keys 41a to 41d are used to shift a cursor displayed on the display 17, or a point where a force is applied. The four direction keys 41a to 41d are made to correspond to the upward, downward, leftward, and rightward directions respectively, and the cursor is made to shift in a direction corresponding to a pushed direction key.

The determination key 42 is used to determine the contents displayed on the display 17. The function selection keys 43a to 43c are used to select a function. For example, the three function selection keys 43a to 43c are made to correspond to a comprehensive service utilization function, a tuner function, a local contents management function, respectively. When one function selection key is pushed, the device main body 10a comes to be of an operation mode corresponding to thus pushed function selection key.

The tool key 44 is a button for use in displaying a tool menu on the display 17. In the tool menu, commands corresponding to the contents displayed on the display 17 are displayed. When the user operates the direction keys 41a to 41d to select an arbitrary command, and then pushes the determination key 42, processing corresponding to thus selected command is carried out in the device main body 10a.

The return key 45 is a button for use in returning the contents displayed on the display 17 to that of the previous state. The remote controller 40 may have arranged thereon various operation keys other than those shown in FIG. 3. For example, the operation keys may be a volume control key, reproduction keys for a CD or an MD, a stop key, etc.

Figure 4:
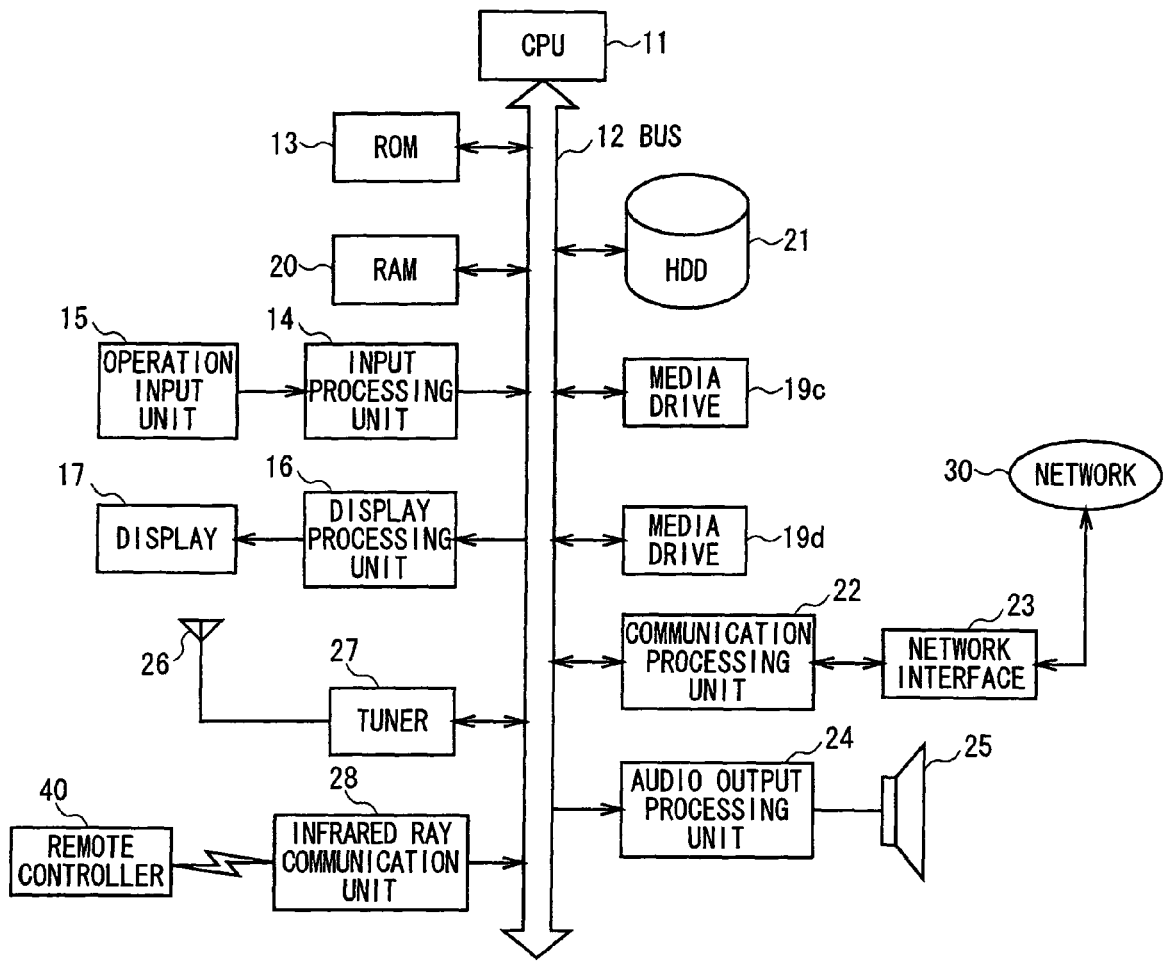
FIG. 4 shows a block diagram of the hardware configuration of the terminal device according to an embodiment of the present invention.

Next, the internal configuration of the terminal device 10 will be explained. FIG. 4 shows a block diagram of the hardware configuration of the terminal device 10. Using the terminal device 10 shown in FIG. 4, various sources such as tunes can be managed, recorded, and reproduced.

A CPU 11 controls the entire terminal device 10 and carrying out the arithmetic processing based on a booted up program. For example, the CPU 11 performs the communication operation through the network 30, input/output operation for the user, reproducing contents from media and clipping operation, storing contents in the HDD 21 and management thereof, and retrieving information through the network 30 based on clipped information, etc. As contents data which corresponds to the terminal device 10 and can be recorded and reproduced thereby, there are audio contents data, moving picture contents data, etc. The CPU 11 sends/receives control signals and data to/from respective circuit units through a bus 12.

A ROM (Read Only Memory) 13 has stored therein performance programs to be executed by the CPU 11, program loaders, respective calculation coefficients, and parameters to be used in programs. In a RAM 20, programs to be executed by the CPU 11 are expanded. The RAM 20 is used also as data region and task region which are necessary when the CPU 11 carries out various processing.

An operation input unit 15 has various operation elements, or operation keys, a jog dial, a touch panel, etc., which are arranged on a housing of the terminal device 10. On the other hand, a keyboard and a mouse for the GUI (Graphical User Interface) operation may be arranged as the operation input unit 15. Information input from the operation input unit 15 is sent to an input processing unit 14 to be processed therein, and thus processed information is sent to the CPU 11 as an operation command. The CPU 11 performs required calculation and control so that a performance of a device responding to the input operation command can be obtained.

As the display 17, for example, a display device such as a liquid crystal display is connected to display various items of information. When the CPU 11 sends display information to a display processing unit 16 depending on various performance status, input status, or communication status, the display processing unit 16 makes the display 17 carry out display performance based on thus sent display information. For example, on the display 17, contents of tune information delivered from a server or contents of clipped information are displayed. Furthermore, when a tune is retrieved through the network 30, the retrieval result is displayed on the display 17.

Media drives 19*c* and 19*d* are drives which can record or reproduce (or only reproduce, depending on the type of recording medium) contents such as tunes recorded in a portable recording medium. The number of kinds of recording media to/from which the media drives 19*c* and 19*d* can record/reproduce data respectively is not restricted to one. That is, the media drives 19*c* and 19*d* can record/reproduce data to/from a plurality of kinds of recording media. For example, the media drive 19*c* reproduces data from a CD or a DVD (Digital Versatile Disc), and the media drive 19*d* records/reproduces data to/from an MD.

The portable recording media which have recorded therein contents such as tunes should not be restricted to optical recording media such as a CD and a DVD. For example, contents can be stored in a recording medium configured by a semiconductor memory such, as a flash memory. In this case, the reader/writer of the flash memory is connected to the bus 12.

The user can listen to tunes by inserting a recording medium (CD, DVD, MD, etc.) having recorded thereon arbitrary contents into media drive 19*c* or 19*d* and performing predetermined operations using the remote controller 40. For example, when the user operates the remote controller 40 and gives an instruction of reproduction by the media drive 19*c*, the CPU 11 gives an instruction of reproducing contents to the media drive 19*c*. Accordingly, the media drive 19*c* has an access to specified contents to read out data from the loaded recording medium.

In case thus read out contents are audio contents, the contents are decoded by the CPU 11 according to need, and thus decoded contents are transferred to an audio output processing unit 24. The audio output processing unit 24 performs acoustic field processing such as equalizing, and processing of volume control, D/A conversion, amplification, and thus processed audio contents are output from a speaker unit 25. The speaker unit 25 is configured by the plural loudspeakers 25*a*, 25*b* shown in FIG. 3, which can output sounds in stereo.

Contents reproduced by the media drives 19*c* and 19*d* can be stored in the HDD 21 as an audio data file under the control of the CPU 11. As for the form of the audio data file, digital audio data of 44.1° KHz sampling frequency and 16 bits quantization in the CD format may be employed. In order to save on the capacity of the HDD 21, compressed audio data that is compressed in accordance with a predetermined method may be employed. The compression method is not restricted, and the ATRAC (Advanced Transform Acoustic Coding, trademark) or the MP3 (MPEG Audio Layer-3) can be employed.

A tuner unit 27 may be an AM FM radio tuner that demodulates broadcasting signals received by the antenna 26 under the control of the CPU 11. The tuner unit 27 may be a television tuner, a satellite broadcasting tuner, or a digital broadcasting tuner. Demodulated broadcasting audio signals undergo required processing in the audio output processing unit 24, and thus processed signals are output from the speaker unit 25 as broadcasting sounds.

A communication processing unit 22 encodes transmission data and decodes reception data under the control of the CPU 11. A network interface 23 transmits transmission data encoded by the communication processing unit 22 to a predetermined external network correspondence device through a network. Moreover, the network interface 23 sends signals transmitted from the external network correspondence device through a network to the communication processing unit 22. The communication processing unit 22 transfers received information to the CPU 11. As information received through the network 30, there are tune information of a program which is being broadcasted by FM broadcasting and tune information included in a title of a music CD.

An infrared ray communication unit 28 communicates with the remote controller 40 using a radio communication means such as an infrared ray. Then, the infrared ray communication unit 28 performs predetermined processing for a signal transmitted from the remote controller 40, and sends thus processed signal to the CPU 11 as an operation command. The CPU 11 performs required calculation and control so that a performance of a device responding to the input operation command can be obtained.

The configuration of the terminal device 10 is not restricted to that of FIG. 4, and other various configurations can be employed. For example, there may be arranged an interface to communicate with a peripheral equipment by employing a communication method such as the USB (Universal Serial Bus), IEEE (Institute of Electrical and Electronics Engineers) 1394, and Bluetooth. Audio contents downloaded by the network interface 23 through the network 30 and audio contents transferred through an interface such as the USB, IEEE 1394 can be stored in the HDD 21. Furthermore, a terminal for use in connecting a microphone or an external headphone, a video output terminal for use in reproducing DVD data, a line connection terminal, an optical digital connection terminal may be arranged. Moreover, a PCMCIA (Personal Computer Memory Card International Association) slot or a memory card slot may be formed to send/receive data to/from an external information processing device or an audio instrument.

Next, the configuration of program modules in the embodiment will be explained. The program module is information having written therein processing which the terminal device 10 is made to carry out, and the terminal device 10 can realize a predetermined function based on the program module. In the following explanation, a function that is realized by carrying out a program module is termed to be the name of the program module.

Figure 5:
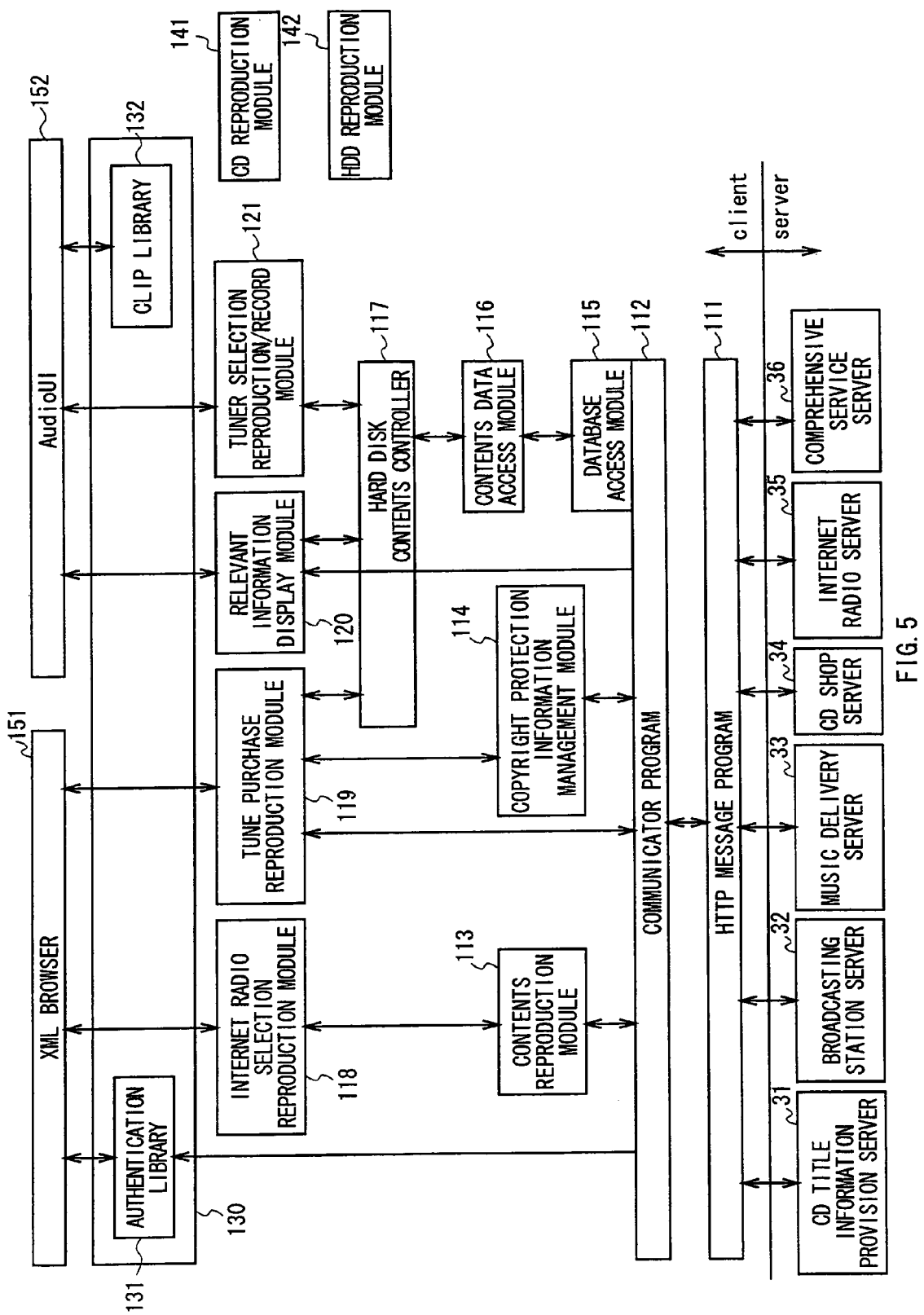
FIG. 5 shows a block diagram of program module configuration of the terminal device according to an embodiment of the present invention.

FIG. 5 shows a block diagram of program module configuration of the terminal device. As shown in FIG. 5, the program modules of the terminal device 10 are so configured as to operate on the OS. The terminal device 10 can communicate with the CD title information provision server 31, broadcasting station server 32, music delivery server 33, CD shop server 34, comprehensive service server 36, Internet radio server 35, and other various servers due to functions of the respective program modules.

An HTTP (Hyper Text Transport Protocol) message program 111 transmits/receives data to/from the respective servers, or the CD title information provision server 31, broadcasting station server 32, CD shop server 34, comprehensive service server 36, etc. by the HTTP communication. A communicator program 112 is a communication module that performs various communications with the comprehensive service server 36, etc.

At the head or upper position (function near the user interface) of the communicator program 112, there are located a contents reproduction module 113 that interprets the codec of contents and reproduces the contents, and a copyright protection information management module 114 that deals with information related to copyright protection. At the head of the contents reproduction module 113, there is arranged an Internet radio selection reproduction module 118 that selects an Internet radio and performs reproduction. At the head of the copyright protection information management module 114, there is arranged a tune purchase reproduction module 119 that deals with purchasing tunes and reproducing tunes for experimental listening.

At the head of the Internet radio selection reproduction module 118 and the tune purchase reproduction module 119, there is arranged an XML (extensible Markup Language) browser 151. The XML browser 151 interprets the contents of XML files transmitted from respective servers, and displays the XML files on the display 17. Contents which the user inputs to the terminal device 10 when the terminal device 10 is of the comprehensive service utilization mode are interpreted by the XML browser 151. Then, processing requirement meeting the input contents is sent from the XML browser 151 to other modules. For example, tunes selected by the user through the XML browser 151 are purchased by the tune purchase reproduction module 119, and are written to the HDD 21 through a hard disc contents controller 117.

To the communicator program 112, an authentication library 131 of a library 130 is connected. The authentication library 131 performs authentication processing of the comprehensive service server 36 and other various servers.

Furthermore, at the head of the communicator program 112, there are arranged a database access module 115, a contents data access module 116, and the hard disc contents controller 117. The database access module 115 has an access to various databases established by the HDD 21. The contents data access module 116 has an access to contents stored in the HDD 21. The hard disc contents controller 117 manages contents stored in the HDD 21.

At the head of the hard disc contents controller 117, there are arranged a relevant information display module 120, a tuner selection reproduction/record module 121, and the tune purchase reproduction module 119. The relevant information display module 120 displays the titles and artist names of tunes broadcasted by a radio station on the display 17. The tuner selection reproduction/record module 121 selects a radio station, and records contents of tunes transmitted from the radio station to the HDD 21.

For example, tunes which are transmitted from a radio station and selected through an audio user interface (Audio UI) 152 are written to the HDD 21 through the contents data access module 116.

The relevant information display module 120 displays the titles, artist names, etc. of tunes which are currently broadcasted from a radio station, which are received by the tuner selection reproduction/record module 121 from the CD title information provision server 31, broadcasting station server 32, etc. through the HTTP message program 111 as relevant information, on the display 17 through the audio user interface 152.

The relevant information displayed on the display 17 through the audio user interface 152 can be made to be temporarily stored in a clip library 132 of the library 130. Furthermore, the relevant information can be eventually made to be stored in the HDD 21 through the database access module 115 in accordance with an instruction from the user.

Moreover, as program modules of the terminal device 10, there are included a CD reproduction module 141 for reproducing data of a CD and an HDD reproduction module 142 for reproducing data of the HDD 21, and thus reproduced data is output through the audio output processing unit 24 and speaker unit 25.

Next, the processing of purchasing audio data of tunes or CD albums using the terminal device 10 will be explained. As described above, the music delivery server 33 and the CD shop server 34 are provided with a function of selling audio data of tunes or CD albums online. The user can download and purchase audio data through the network 30 by operating the terminal device 10 to have an access to the music delivery server 33. The user can have music CD's delivered to the user's home by operating the terminal device 10 to have an access to the CD shop server 34 to perform purchase procedure.

In case of performing the procedure of purchasing tunes using those servers, the user transmits a retrieval keyword to the server from the terminal device 10, and displays a table of tune lists or their list names retrieved by the server on the display 17 of the terminal device 10. Then, the purchase processing is carried out by specifying desired tunes or a tune list (for example, a CD album) from displayed tunes or tune lists.

Other than this, it is possible to retrieve tunes or their tune list to be purchased using clipped information that is clipped by the terminal device 10. For example, in case the user is pleased with a broadcasted tune when receiving an FM radio program using the terminal device 10, the user can perform clipping operation for the tune and receive relevant information of the tune from the broadcasting station server 32 to store thus received relevant information as clipped information. Thus received relevant information contains, for example, an identification code of a music CD that has the tune recorded therein. Transmitting the identification code to the music delivery server 33 or the CD shop server 34 as a retrieval keyword, a list of tunes recorded in the music CD is received to be displayed on the terminal device 10. After confirming thus displayed tune list, the user can perform the procedure of purchasing the music CD.

When the music delivery server 33 or the CD shop server 34 performs the retrieval, and a table of tune lists or their list names as the retrieval result is displayed on the terminal device 10, the server provides a service of allowing experimentally listening to tunes in the lists. In the present embodiment, as an example, each of the servers is provided with a consecutive reproduction function of consecutively reproducing part of respective tunes in a tune list such as a CD album, etc. This function makes the user who considers purchasing tunes confirm the contents, and also introduces the tunes to bring forward the selling.

Next, the processing of performing retrieval by the respective servers, experimentally listening to tunes employing the consecutive reproduction, and purchasing the tunes will be explained. In the following explanation, as one example, the case of purchasing tunes from the music delivery server 33 will be explained. On the other hand, similar processing is possible in the case of the CD shop server 34.

Figure 6:
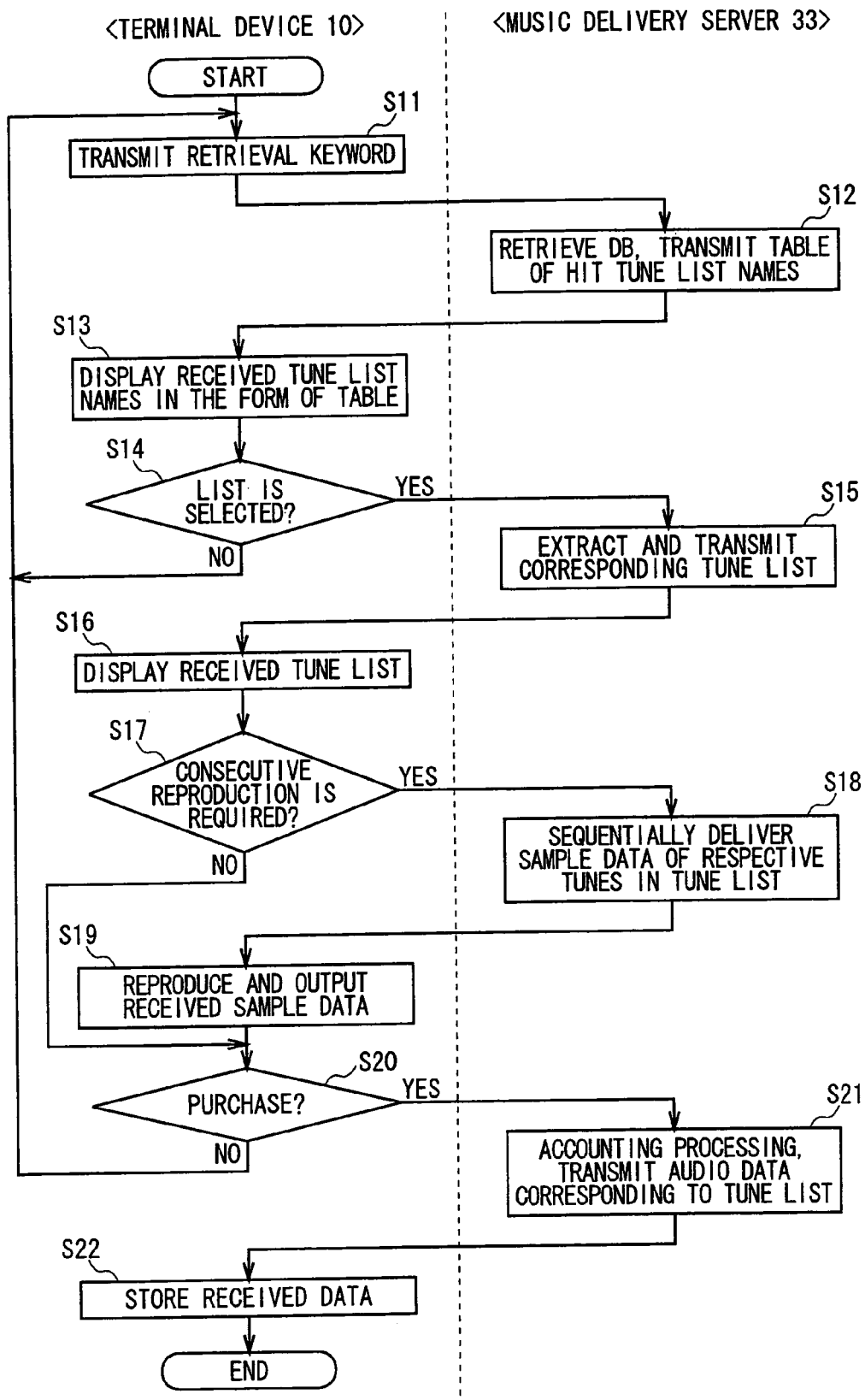
FIG. 6 shows a flow chart indicative of the processing of purchasing tunes using the music delivery server.

FIG. 6 shows a flow chart indicative of the processing of purchasing tunes using the music delivery server 33. In step S11, the terminal device 10 transmits a retrieval keyword to the music delivery server 33 in answer to the input operation by the user through the remote controller 40. As the retrieval keyword, for example, a tune name, an artist name, a CD album name, or an identification number of a music CD is employed. For example, these retrieval keywords can be extracted from clipped information. In this case, by displaying the contents of the clipped information on the display 17 and selecting information as a retrieval keyword therefrom, the information can be transmitted to the music delivery server 33.

In step S12, the music delivery server 33 retrieves a database using the retrieval keyword transmitted from the terminal device 10, and extracts tune list names which are hit by the retrieval. As tune lists, lists of CD albums are employed. Then, a table of extracted tune list names is transmitted to the terminal device 10.

In step S13, the terminal device 10 displays thus received tune list names on the display 17 in the form of a table. At this time, as will be described later, whether or not the consecutive reproduction function is active is demonstrated for the respective tune lists.

In step S14, in case an arbitrary list is selected from the displayed tune list names by the user, a control signal meeting the selection is transmitted to the music delivery server 33, going to step S15. It is also possible to return to step S11 to perform re-retrieval without selecting a list.

In step S15, the music delivery server 33 extracts a tune list corresponding to the selected tune list name from a database, and transmits thus extracted tune list to the terminal device 10. In step S16, the terminal device 10 displays thus received tune list on the display 17. At this time also, as will be described later, whether or not the tune list is provided with the consecutive reproduction function is demonstrated on the screen. As the retrieval result using the retrieval keyword specified in step S11, a list of tunes may be directly output to be displayed on the terminal device 10.

In the step S17, in case the consecutive reproduction is required by the operation of the user, the terminal device 10 transmits a control signal requiring the consecutive reproduction to the music delivery server 33, going to step S18. In step S18, the music delivery server 33 sequentially reads out sample data obtained by extracting part of respective tunes in the tune list from a database, and delivers thus read out sample data to the terminal device 10 in the streaming manner. Otherwise, sample data obtained by sequentially connecting part of tunes in the tune list may be delivered. The sample data is compressed under a compression ratio higher than that employed in compressing audio data of tunes to be transmitted after purchase, and is of data format which can be reproduced only once by the terminal device 10, and cannot be stored in a secondary storage device.

In step S19, the terminal device 10 sequentially reproduces and outputs received sample data. Accordingly, the user can experimentally listen to recorded tunes of a CD album which the user considers purchasing.

In step S20, in case purchasing the tune list is required by the operation of the user, a control signal requiring the purchase procedure is transmitted to the music delivery server 33. In step S17, it is also possible to go to the purchase procedure without experimentally listen to tunes employing the consecutive reproduction.

In step S21, for example, after carrying out a predetermined accounting processing for the user, the music delivery server 33 extracts audio data corresponding to the tune list from a database, and transmits thus extracted audio data to the terminal device 10. Otherwise, the music delivery server 33 may perform the accounting processing for the user after transmitting the audio data to the terminal device 10.

In step S22, the terminal device 10 makes received audio data be stored in a secondary storage medium (for example, HDD 21). Accordingly, the user can reproduce and listen to purchased audio data anytime.

On the other hand, in the music delivery server 33, sample data for enabling consecutive reproduction is not prepared with respect to all stored tune lists. Accordingly, it is necessary that the user can judge whether or not the displayed tune list is provided with the consecutive reproduction function by taking a look at it. Therefore, in step S16 of above-described flow chart, whether or not the consecutive reproduction is possible is demonstrated on the display 17 of the terminal device 10. Furthermore, it is desirable that whether or not the consecutive reproduction function is provided is demonstrated for the respective tune lists at the time of displaying the tune list names in the form of a table (step S13). Hereinafter, the processing of displaying such a screen will be explained by referring to a screen display example.

Figure 7:
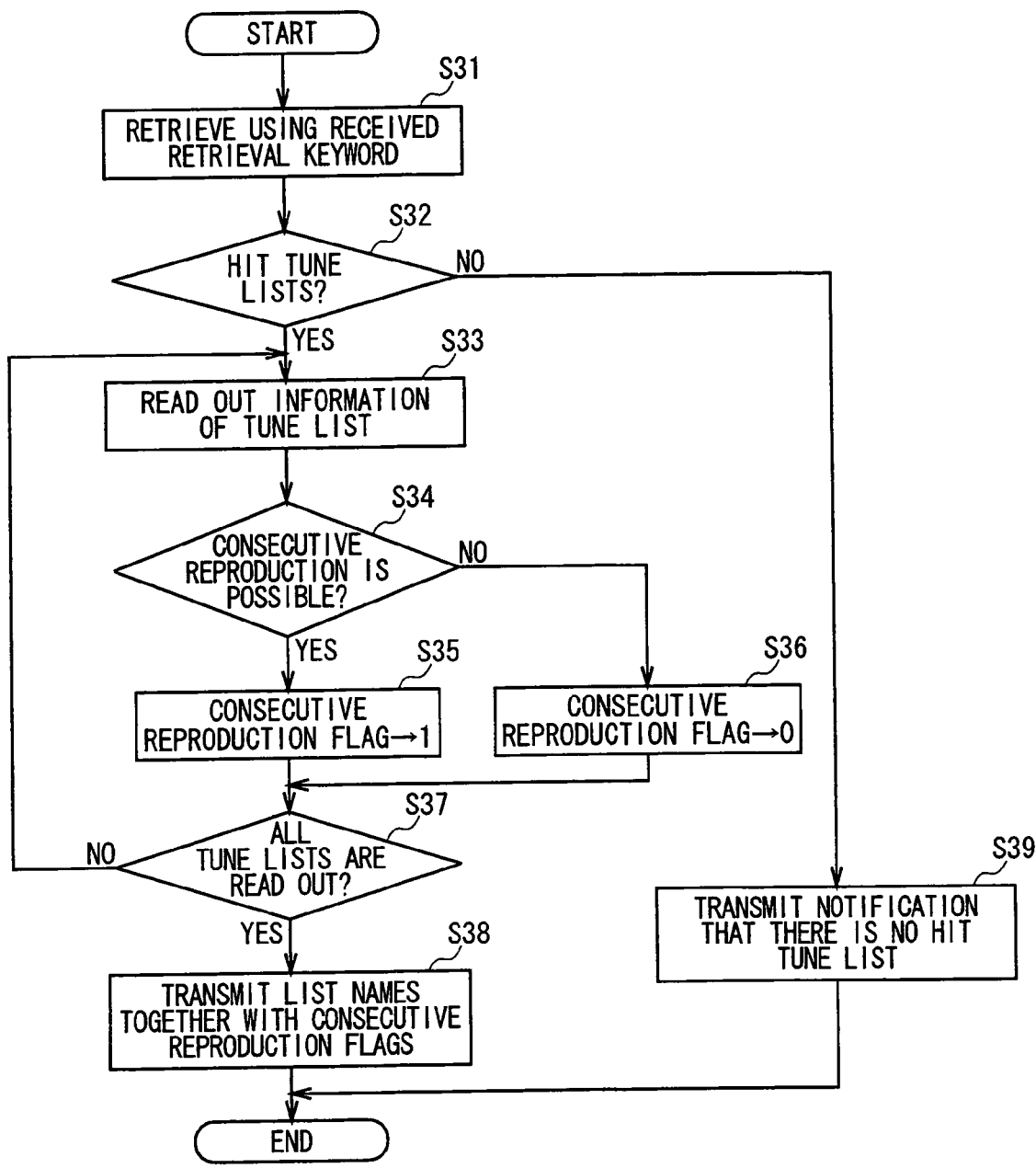
FIG. 7 shows a flow chart indicative of the processing of the music delivery server in transmitting a table of tune list names.

FIG. 7 shows a flow chart indicative of the processing of the music delivery server 33 in transmitting a table of tune list names. The processing corresponds to step S12 of FIG. 6. When receiving a retrieval keyword from the terminal device 10, in step S31, the music delivery server 33 retrieves a database using the retrieval keyword. In step S32, the music delivery server 33 goes to step S33 in case there exist tune lists which are hit by the retrieval keyword, while goes to step S39 in case there exists no tune list.

In step S33, the music delivery server 33 reads out information of one tune list out of hit tune lists from a database. For example, the music delivery server 33 reads out the name (title of a CD album etc.) of the tune list, information indicating whether or not sample data of recorded tunes exists, information indicating whether or not the sample data can be consecutively reproduced.

In order to judge the possibility of the consecutive reproduction of tunes, a flag indicative of the possibility of the consecutive reproduction may be correspondingly stored in respective tune lists to make reference to the flag in the processing of step S33. Otherwise, information of respective tunes in a read out tune list may be scanned to judge that the consecutive reproduction is possible in case sample data is prepared for plural tunes.

Base on the judgment, in step S34, the processing goes to step S35 in case the consecutive reproduction is possible for the tune list, while goes to step S36 in case the consecutive reproduction is impossible. In step S35, the value of a consecutive reproduction flag indicative of the possibility of the consecutive reproduction is set to be "1". On the other hand, in step S36, the value of the consecutive reproduction flag is set to be "0".

In step S37, the music delivery server 33 judges whether or not all tune lists which are hit by the retrieval keyword are read out, and returns to step S33 to carry out the processing for the next tune list in case there exist tune lists which are not read out. On the other hand, the processing goes to step S38 in case all tune lists are read out.

In step S38, to the list names of the respective tune lists which are processed in step S33 to step S37, the music delivery server 33 appends corresponding consecutive reproduction flags to generate transmission data, and transmits thus generated transmission data to the terminal device 10.

In step S32, in case there exists no tune list which is hit by the retrieval keyword, in step S39, a notification that there is no hit tune list is transmitted to the terminal device 10.

Figure 8:
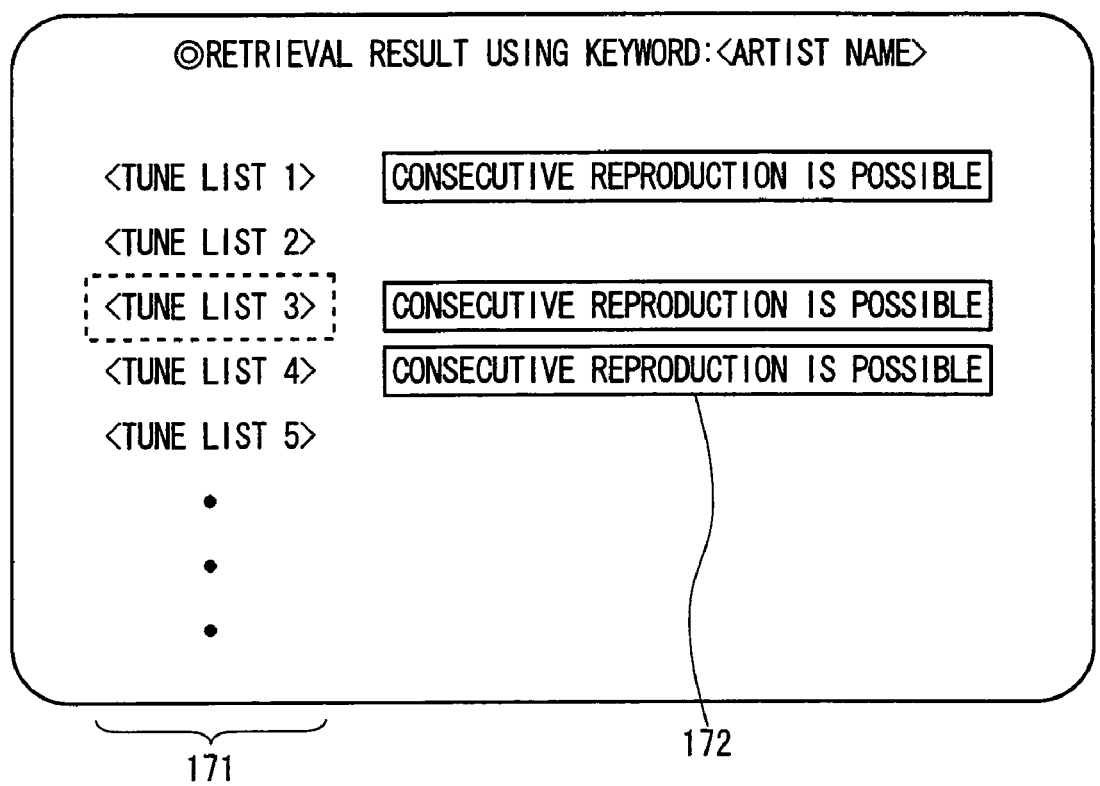
FIG. 8 shows an example of a screen display that displays retrieved tune list names in the form of a table.

FIG. 8 shows an example of a screen display that displays retrieved tune list names in the form of a table. Receiving the data generated in the processing of FIG. 7, the terminal device 10 comes to be able to display a screen shown in FIG. 8. This is an example of a screen obtained when the terminal device 10 displays tune list names which are hit by the retrieval keyword in the form of a table, which corresponds to a screen displayed in step S13 of FIG. 6. On this screen, in a display unit 171, names of the retrieved tunes lists are displayed in the form of a table, and in case there are some tune lists which are provided with the consecutive reproduction function, an icon 172 indicating that the consecutive reproduction is possible is displayed next to the tune lists, respectively. The icon 172 is displayed for only tunes lists whose consecutive reproduction flag value from the music delivery server 33 is "1".

When an arbitrary tune list name in the display unit 171 is selected and determined using the direction keys 41a, 41b and determination key 42 of the remote controller 40, the contents of thus selected tune list can be displayed.

Displaying the screen using the terminal device 10, the user comes to be able to find tune lists whose tunes can be consecutively reproduced at one view. Accordingly, the user does not carry out the operation of returning to an original page or switching to a different page after finding that the experimental listening is impossible at a time point when the page switches from a page displaying tune lists in the form of a table to a page displaying the contents of a tune list after selecting the tune list from the table. Especially, the convenience is improved for the user who performs the retrieval so as to experimentally listen to tunes.

Figure 9:
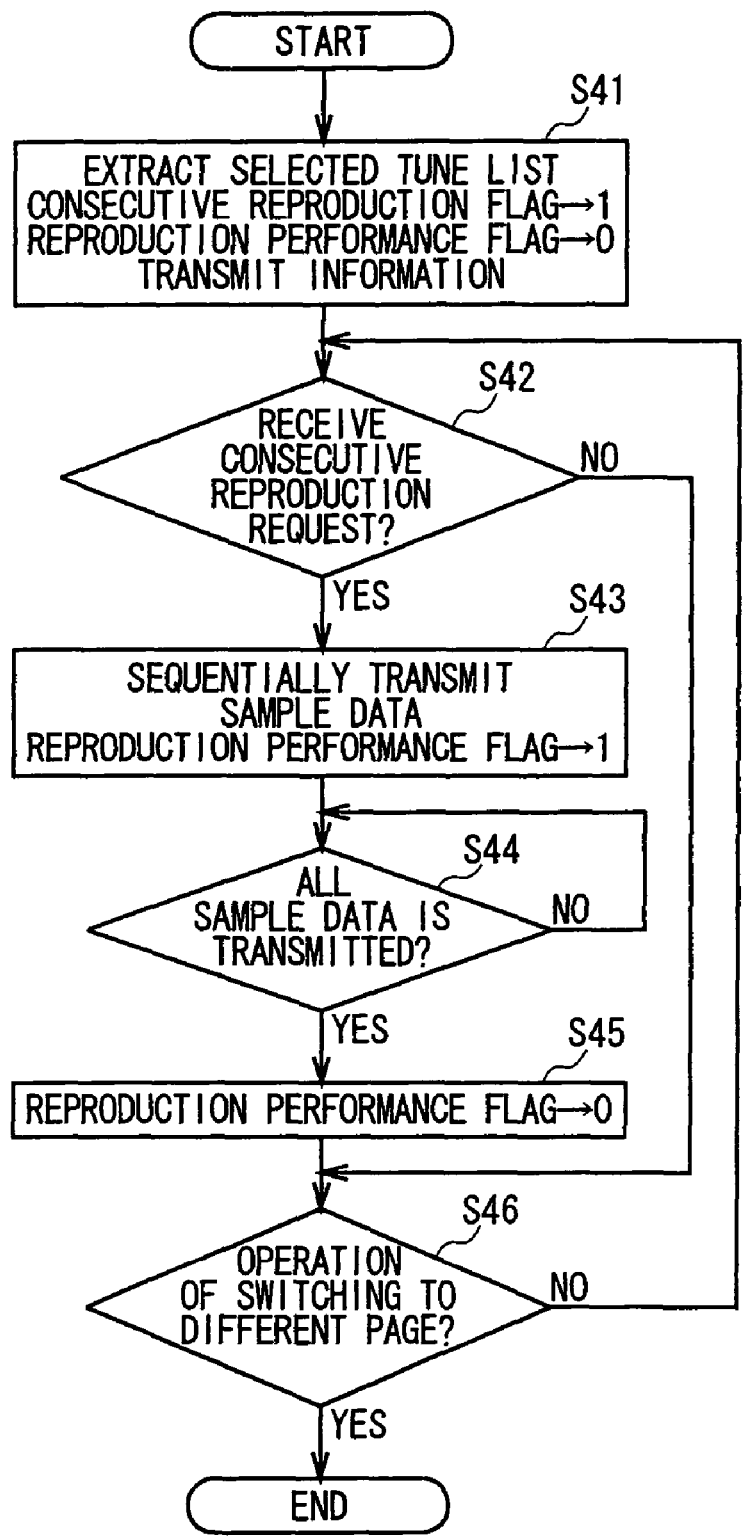
FIG. 9 shows a flow chart indicative of the processing of the music delivery server in transmitting a tune list selected from a table of tune list names and at the time of consecutive reproduction.

FIG. 9 shows a flow chart indicative of the processing of the music delivery server 33 in transmitting a tune list selected from a table of tune list names and at the time of the consecutive reproduction. The processing corresponds to step S15 and step S18 of FIG. 6.

In step S41, the music delivery server 33 extracts a tune list selected from tune list names displayed in the form of a table by the terminal device 10 from a database. In this case, it is assumed that, using the terminal device 10, a tune list name with a display indicating that the consecutive reproduction is possible is selected. The music delivery server 33 sets the value of the consecutive reproduction flag to be "1", and sets the value of a reproduction performance flag indicating whether or not consecutive reproduction is being performed to be "0". Then, together with the tune list, the consecutive reproduction flag and the reproduction performance flag are transmitted to the terminal device 10.

In step S42, in case of receiving a control signal requiring the consecutive reproduction from the terminal device 10, the music delivery server 33 goes to step S43. In case of not receiving the control signal, the music delivery server 33 goes to step S46. In step S43, the music delivery server 33 sequentially reads out sample data of respective tunes from a database, and transmits thus read out sample data to the terminal device 10. Furthermore, when the transmission is started, the value of the reproduction performance flag is set to be "1", and is transmitted together. In step S44, when all sample data is transmitted, the music delivery server 33 goes to step S45.

In step S45, at the time when transmitting sample data is ended, the music delivery server 33 sets the value of the reproduction performance flag to be "0", and transmits the flag to the terminal device 10. In step S46, the music delivery server 33 judges whether or not the operation of switching to a different page, for example, the operation of selecting a tune name to acquire relevant information, or the operation of switching to a screen for purchasing a tune list is carried out by the terminal device 10, and in case the operation is carried out, the processing is ended. On the other hand, in case the operation is not carried out, the processing returns to step S42 to wait for a signal requesting the consecutive reproduction.

Figure 10:
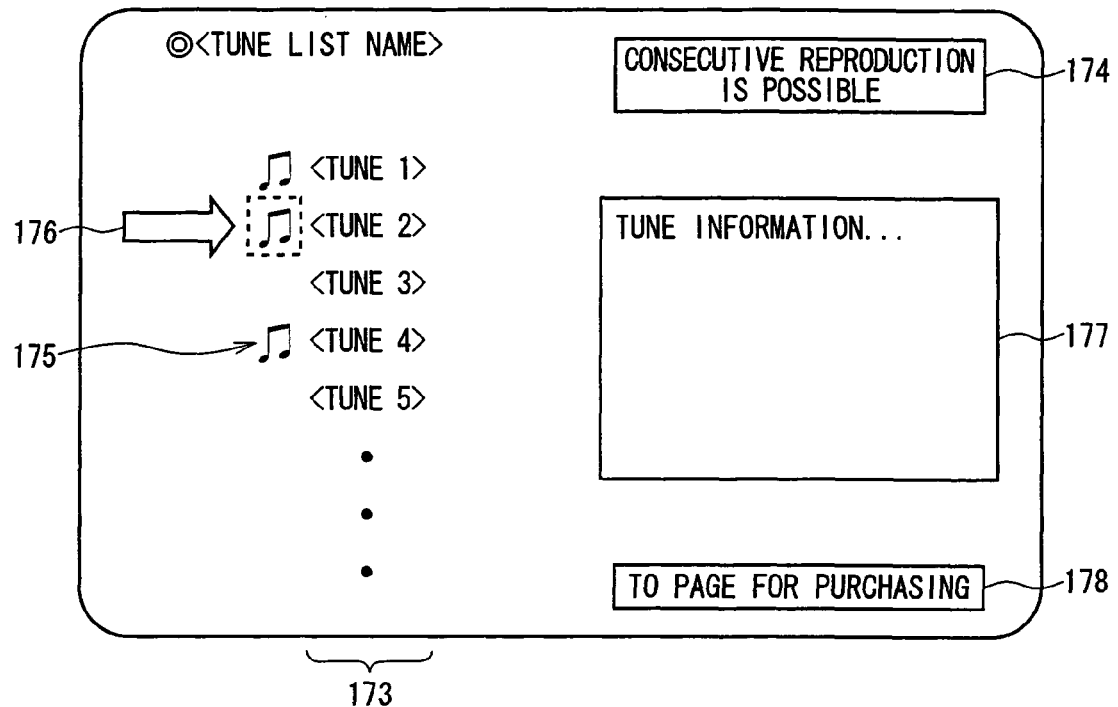
FIG. 10 shows an example of a screen that displays the contents of a selected tune list.
Figure 10:
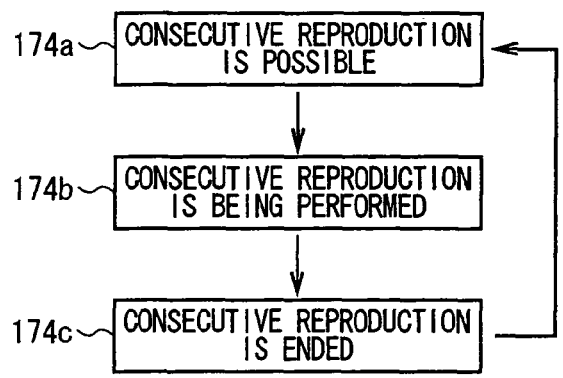

FIG. 10 shows an example of a screen that displays the contents of a selected tune list. FIG. 10(A) shows an example of a screen that is displayed based on information received from the music delivery server 33 in step S41 of FIG. 9. In this screen, a display unit 173 that displays tune names in the form of a table and an icon 174 indicating that the consecutive reproduction is possible are displayed. In case there are some tunes for which sample data is prepared, an icon 175 is displayed next to the tune names, respectively. Selecting and determining any one of the icons 175 of the tunes using the direction keys 41a, 41b and determination key 42, the user can experimentally listen to sample data of the tune. At this time, with a selected tune being the beginning, sample data of the following tunes is consecutively reproduced automatically.

In case the consecutive reproduction is started, in answer to the change of the reproduction performance flag transmitted from the music delivery server 33 to "1", the terminal device 10 changes the image of the icon 174 to demonstrate that the consecutive reproduction is being performed. Furthermore, when reproducing all sample data is ended and the reproduction performance flag is set to be "0", the image of the icon 174 is further changed to demonstrate that the consecutive reproduction is ended.

FIG. 10(B) shows an example of transition of the image of the icon 174. As shown in this drawing, an image 174b demonstrating that the consecutive reproduction is being performed, and an image 174c demonstrating that the consecutive reproduction is ended are displayed. The image 174c may be so displayed as to be returned to an image 174a indicating that the consecutive reproduction is possible, after being displayed for a predetermined time period of, for example, approximately 10 seconds.

In the image of FIG. 10(A), a pointer 176 points a tune that is currently being reproduced. Accordingly, when the consecutive reproduction is getting on, the position of the pointer 176 is sequentially changed. The pointer 176 may be made to flash on and off during reproduction. Furthermore, sample data of a tune pointed by the pointer 176 may be reproduced by changing the position of the pointer 176 using the direction keys 41a, 41b. In case the pointer 176 is moved or the icon 175 is selected, for example, when the terminal device 10 transmits a tune number corresponding to the position to the music delivery server 33, and the music delivery server 33 transmits sample data corresponding to the tune number, tune reproduction control corresponding to the position can be realized.

Furthermore, in case a tune on the display unit 173 is selected and determined using the direction keys 41a, 41b and determination key 42, information related to the tune may be displayed on a display unit 177. On the display unit 177, for example, a lyric writer, a musical composer, or musical performers of the tune, reproduction time, a jacket picture of a CD album may be displayed as relevant information. Moreover, the page may be switched to a page for carrying out the procedure of purchasing the tune list (for example, a CD album) by selecting and determining an icon 178.

In this way, in the image of FIG. 10(A), since the icon 174 demonstrates that the consecutive reproduction is possible, the user comes to be able to judge the possibility of the consecutive reproduction at one view. Furthermore, since the icon 174 is changed at the time of carrying out and ending the consecutive reproduction to demonstrate the performance state, the user can understand the performance state and continues the operation of experimental listening and switching the image without being confused.

In above-described explanation, the processing between the servers from which tunes can be purchased and the terminal device 10 is explained. On the other hand, the present invention can be applied to all servers which have information of such as tunes or tune lists, and provide these tunes as lists, and can consecutively reproduce sample data of respective tunes to enable experimentally listening.

The processing function in above-described embodiment can be realized by a server computer of a client server system. In this case, a server program that has written therein the processing contents of a function which the music delivery server 33 should have is provided. When the server computer executes the server program responsive to a requirement from a client computer, above-described processing function is realized by the server computer, and the processing result is provided to the client computer.

That is, various processing functions in above-described embodiment can be performed by the hardware configuration shown in FIG. 2 and FIG. 4, and also can be performed by software. In this case, by installing a server program configuring the software to a general-purpose server computer etc., which can carry out a processing corresponding to the server program when the program is installed, through a network or a recording medium, above-described various processing functions can be performed.

Furthermore, a server program may be recorded to a recording medium whose data can be read out by a server computer. In this case, as a recording medium, for example, a magnetic disc (hard disc, floppy disc, etc.), a magnetic tape, an optical disc (DVD, DVD-RAM, CD-ROM, CD-R (Recordable)/RW (Rewritable), etc.), a magnetic optical disc (MO (Magneto-Optical disc) etc.), a semiconductor memory, etc. can be employed.

In case of circulating a server program, for example, portable recording media, or DVDs, CD-ROMs, etc. having stored therein the server program are sold. A server computer that executes the server program stores the server program recorded in the portable recording media in a storage device thereof. Then, the server computer reads out the server program from the storage device thereof, and performs a processing in accordance with the server program. The server computer may read out the server program directly from the portable recording media to perform a processing in accordance with the server program.

Furthermore, in above-described embodiment, whether or not tune data as contents can be consecutively reproduced is demonstrated to the user through the icon 174. On the other hand, the present invention is not restricted to this, and whether or not image data as contents can be consecutively reproduced may be demonstrated through the icon 174.

In above-described embodiment, as broadcasting that can be received by the terminal device 10, radio broadcasting broadcasted from a radio station is employed. On the other hand, the present invention is not restricted to this, and the terminal device 10 may receive Internet radio broadcasting or satellite broadcasting to acquire relevant information thereof, or receive television broadcasting broadcasted from a television broadcasting station to acquire various items of information related to television programs of the television broadcasting through a server on a network.

Furthermore, in above-described embodiment, the various circuits shown in FIG. 4 and the program modules shown in FIG. 5 are installed to the terminal device 10. On the other hand, the present invention is not restricted to this, and these circuits and program modules may be installed to various terminal devices other than the terminal device 10 such as a cellular phone and a personal computer, and processing similar to that of the terminal device 10 can be carried out so long as the terminal devices have the various circuits and program modules installed thereto.

INDUSTRIAL APPLICABILITY

The present invention can be widely utilized in communication apparatuses that provide contents which can be reproduced.

The invention claimed is:

1. A communication apparatus that retrieves contents and transmits the retrieved contents, comprising:
a processor;
reception means for receiving a retrieval keyword, used to request contents, transmitted from an external device;
retrieval means for retrieving contents from a database based on the retrieval keyword received by the reception means;
page information generation means for generating page information, including list information of the contents retrieved by the retrieval means, to be displayed on a display unit of the external device, and appending and displaying on the display unit, at a position adjacent to corresponding list information of contents, notification information that is an icon or text information that displays on the display unit and indicates to a user whether or not the corresponding list information of contents is provided with a consecutive reproduction function that makes the external device consecutively play audibly and/or visually the retrieved contents in the corresponding list information; wherein
the page information generation means appends identification information that indicates whether or not the page information is provided with the consecutive reproduction function to the page information, and makes the external device display a notification indication corresponding to the identification information; and
transmission means for transmitting the page information generated by the page information generation means to the external device.

2. The communication apparatus according to claim 1, wherein during a period of time when respective items in the list information are selected in turn, and part of contents related to the selected items is transmitted to the external device for reproduction respectively, the page information generation means appends notification information, which is an icon that displays that the part of contents is being consecutively reproduced, respectively to the page information.

3. The communication apparatus according to claim 1, wherein when transmitting all items in the list information to the external device for reproduction is completed, the page information generation means appends notification information displaying that the consecutive reproduction is completed to the page information.

4. The communication apparatus according to claim 1, wherein in case the page information displaying the list information of contents including those retrieved by the retrieval means is generated, the page information generation means further appends information that displays whether or not the contents are reproduced at the time of carrying out the consecutive reproduction function with respect to items of respective contents in the list information.

5. The communication apparatus according to claim 1, wherein in case the page information displaying a table of the list information is generated as the retrieval result of the retrieval means, the page information generation means appends information that displays whether or not the list information in the table is provided with the consecutive reproduction function respectively.

6. The communication apparatus according to claim 1, wherein the contents are tunes, and at the time of carrying out the consecutive reproduction function, audio data corresponding to part of the contents is consecutively transmitted to the external device.

7. A communication method for retrieving contents and providing thus retrieved contents, comprising:
receiving a retrieval keyword that requests contents from an external device;
retrieving contents from a database based on the received retrieval keyword;
generating page information, including list information of retrieved contents, to be displayed on the external device, and appending notification information that displays whether or not the page information is provided with a consecutive reproduction function of making the external device consecutively play audibly and/or visually the retrieved contents in the list information, respectively to the page information; wherein
generating the page information includes appending identification information that indicates whether or not the page information is provided with the consecutive reproduction function to the page information, and makes the external device display a notification indication corresponding to the identification information;
transmitting the generated page information to the external device; and
displaying the generated page information and the notification information on a display unit of the external device.

8. A computer readable storage medium encoded with instructions which when executed by a computer cause a processor to execute a method of retrieving contents and providing thus retrieved contents, the method comprising:
receiving a retrieval keyword that requests contents from an external device;
retrieving contents from a database based on the received retrieval keyword;
generating page information, including list information of retrieved contents, to be displayed on the external device, and appending notification information that displays whether or not the page information is provided with a consecutive reproduction function of making the external device consecutively play audibly and/or visually the received contents in the list information, respectively to the page information; wherein
generating the page information includes appending identification information that indicates whether or not the page information is provided with the consecutive reproduction function to the page information, and makes the external device display a notification indication corresponding to the identification information;
transmitting the generated page information to the external device; and
displaying the generated page information and the notification information on a display unit of the external device.

9. A communication apparatus, comprising:
list information request information transmission means for transmitting request information requesting list information of contents to an external device;
page information reception means for receiving page information, including list information of contents, to be displayed on a display unit of the external device and displaying on the display unit notification information indicating that part of respective contents included in the list information can be consecutively played audibly and/or visually, which are transferred from the external device in answer to the request information requesting the list information; wherein
a page information generation means appends identification information that indicates whether or not the page information is provided with the consecutive reproduction function to the page information, and makes the external device display a notification indication corresponding to the identification information;
output means for outputting the page information including the list information of contents and the notification information indicating that the consecutive reproduction is possible;
consecutive reproduction request information transmission means for transmitting request information that requests consecutively reproducing part of respective contents included in the list information to the external device; and
reproduction means for sequentially receiving and reproducing data of part of respective contents included in the list information, which is transferred from the external device in answer to the request information requesting the consecutive reproduction.

10. The communication apparatus according to claim 9, wherein the consecutive reproduction request information transmission means transmits request information requesting part of currently selected contents to the external device.

11. The communication apparatus according to claim 9, wherein the reproduction means sequentially receives and reproduces streaming data of part of respective contents included in the list information, which is transferred from the external device in answer to the request information requesting the consecutive reproduction.

12. The communication apparatus according to claim 9, further comprising retrieval keyword transmission means for transmitting a retrieval keyword that requests contents to an external device, wherein
the page information reception means receives page information including a table of list information retrieved by the retrieval keyword and information that indicates whether or not each list information in the table is provided with the consecutive reproduction function respectively, and
the output means outputs the page information including the table of list information and the information that indicates whether or not each list information in the table is provided with the consecutive reproduction function respectively.

13. The communication apparatus according to claim 9, wherein during a period of time when the data of part of respective contents is reproduced by the reproduction means, the output means outputs information indicating that the data of part of respective contents is being consecutively reproduced.

14. The communication apparatus according to claim 13, wherein when reproducing the data of part of respective contents by the reproduction means is completed, the output means outputs information indicating that the consecutive reproduction is completed.

15. The communication apparatus according to claim 14, wherein after outputting the information indicating that the consecutive reproduction is completed for a predetermined period of time, the output means re-outputs the information indicating that the consecutive reproduction is possible.

16. A communication method, comprising:
transmitting request information requesting list information of contents to an external device;
receiving page information, including list information of contents, to be displayed on a display unit of the external device and displaying on the display unit notification information indicating that part of respective contents included in the list information can be consecutively played audibly and/or visually, which are transferred from the external device in answer to the request information requesting the list information; wherein
a page information generation means appends identification information that indicates whether or not the page information is provided with the consecutive reproduction function to the page information, and makes the external device display a notification indication corresponding to the identification information;
outputting the page information including the list information of contents and the notification information indicating that the consecutive reproduction is possible;
transmitting request information that requests consecutively reproducing part of respective contents included in the list information to the external device; and
sequentially receiving and reproducing data of part of respective contents included in the list information, which is transferred from the external device in answer to the request information requesting the consecutive reproduction.

17. A computer readable storage medium encoded with instructions which when executed by a computer cause a processor to execute a method for communication processing, the method comprising:
transmitting request information requesting list information of contents to an external device;
receiving page information, including list information of contents, to be displayed on a display unit of the external device and displaying on the display unit notification information indicating that part of respective contents included in the list information can be consecutively played audibly and/or visually, which are transferred from the external device in answer to the request information requesting the list information; wherein
a page information generation means appends identification information that indicates whether or not the page information is provided with the consecutive reproduction function to the page information, and makes the external device display a notification indication corresponding to the identification information;
outputting the page information including the list information of contents and the notification information indicating that the consecutive reproduction is possible;
transmitting request information that requests consecutively reproducing part of respective contents included in the list information to the external device; and
sequentially receiving and reproducing data of part of respective contents included in the list information, which is transferred from the external device in answer to the request information requests the consecutive reproduction.

18. A communication apparatus that retrieves contents and provides thus retrieved contents, comprising:
a reception unit configured to receive a retrieval keyword that requests contents from an external device;
a retrieval unit configured to retrieve contents from a database based on the retrieval keyword received by the reception unit;
a page information generation unit configured to generate page information, including list information of contents retrieved by the retrieval unit, to be displayed on a display unit of the external device, and appending and displaying on the display unit notification information that displays whether or not the page information is provided with a consecutive reproduction function of making the external device consecutively play audibly and/or visually part of the retrieved contents included in the list information, respectively to the page information; wherein
the page information generation unit appends identification information that indicates whether or not the page information is provided with the consecutive reproduction function to the page information, and makes the external device display a notification indication corresponding to the identification information;
a transmission unit configured to transmit the page information generated by the page information generation unit to the external device.

19. The communication apparatus according to claim 1, wherein the notification information is displayed in the page information adjacent to a name of a list.

20. The communication apparatus according to claim 1, wherein the list information is displayed in a table.

21. The communication apparatus according to claim 1, wherein the notification information includes text.

* * * * *